United States Patent Office 2,778,583
Patented Jan. 22, 1957

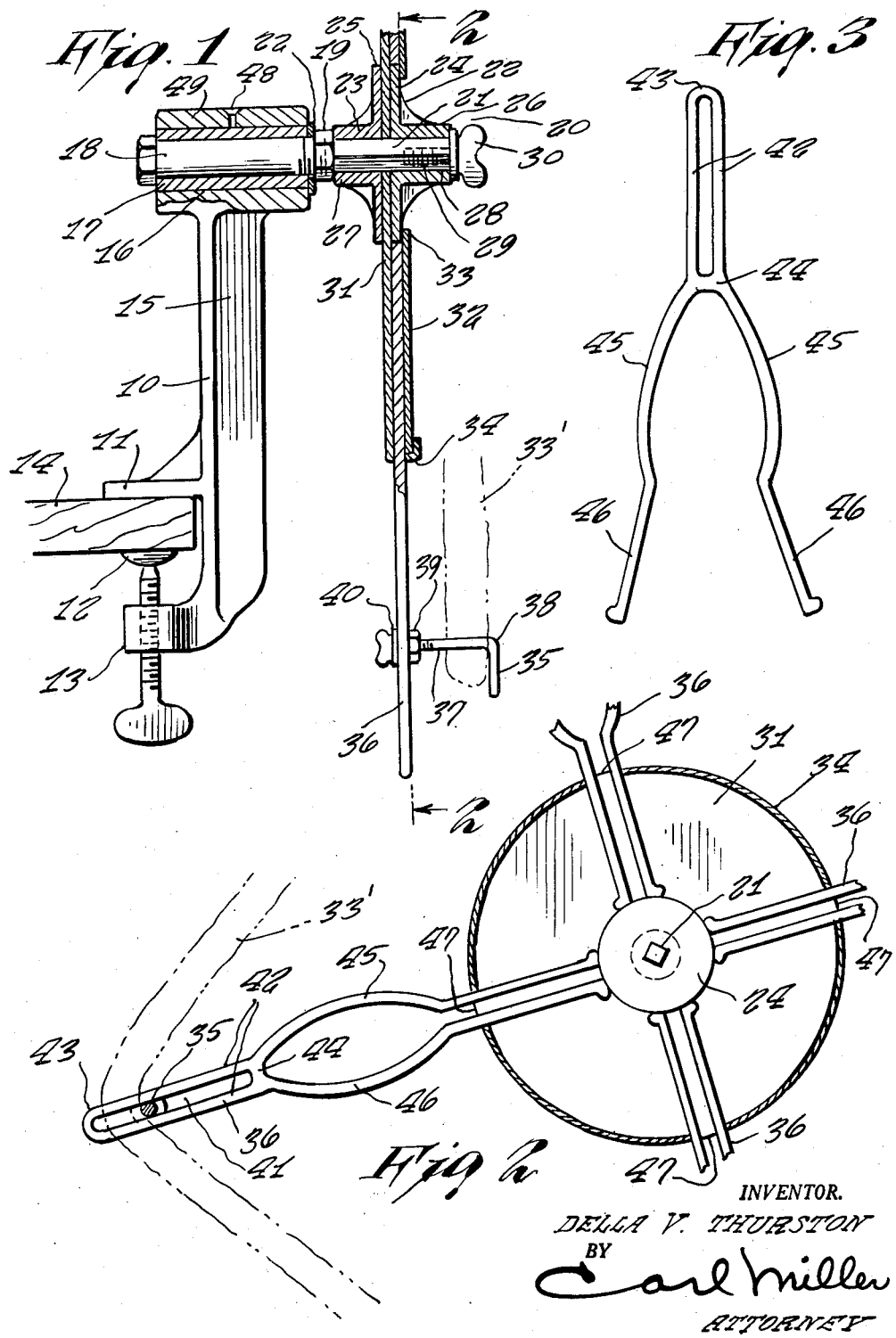

2,778,583
SKEIN HOLDER FOR YARN
Della V. Thurston, Eureka, Calif.

Application June 21, 1954, Serial No. 438,052

2 Claims. (Cl. 242—114)

This invention relates to skein holders for yarn for use in connection with unwinding such yarn from the skeins, in which form they are usually supplied to retail outlets, into balls. One can well appreciate the need for such a device which will prevent the yarn from becoming entangled or broken in the process of transforming the skein into a yarn ball.

Numerous skein holders have been developed for this purpose, but in the main they are subject to the imperfections of being cumbersome and difficult to take apart and reassemble.

The instant device overcomes these objections efficiently by the provision of a unit which is in addition simple and economical to manufacture.

Consequently, it is an object of this invention to provide a skein holder which is economical to fabricate, simple to assemble or disassemble and also which is efficient in operation, with adjustable features for accommodating skeins of varying sizes.

Another inventive object is a skein holder which provides yarn holding arms formed so that each arm comprises two spaced prongs resiliently urged apart so that the insertion of these prongs into a slot will force the prongs together for retention purposes, whereby the skein holder can readily be torn down for carrying or storage purposes.

Other objects and inventive details will become apparent from the following description, when taken in conjunction with the subjoined drawing in which:

Figure 1 shows an assembly of the device partly in section.

Figure 2 shows a sectional view taken along plane 2—2 of Figure 1.

Figure 3 shows an elevation of one of the yarn holder arms.

Referring to Figure 1, the skein holder assembly is seen to comprise the bracket 10 having the clamping jaw 11 facing the clamp 12 threaded to the arm 13 for clamping action against the table or the like 14. Integrally connected to and extending transversely from the jaw 11 is the support strut 15 formed with the bearing bore 16 in which rotates the bearing 17 affixed to the bolt shaft 18 by means of the nut 19. Thus, a rotatable shaft is provided for simple connection to the sub-assembly 20 which holds the yarn. Sub-assembly 20 comprises the square key shaft 21 which is threaded at the end adjacent the nut 19 for convenient connection thereto. To provide a greater bearing surface for the nut 19, the washer 22 is inserted between the said nut and the shaft assembly. The key shaft 21 fits into aligned square holes provided through the center of two wheel hubs 22 and 23 having the retaining flange discs 24 and 25 transversely extending from the central bosses 26 and 27. The key shaft end 28 is centrally threaded for coaction with the screw 29 provided with the actuating head 30, whereby the two wheel hubs may be pressed towards each other. The disc 31, centrally perforated for the protrusion of shaft 21 is located between the wheel hubs 22 and 23 for the retention by said hubs upon application of pressure due to the actuation of screw 29. A second disc 32, having a central perforation of diameter slightly less than that of the wheel hubs, abuts the outer surface of flange disc 24 along the inner edge 33 and is parallelly spaced from the disc 31. A flexible rim 34, integrally attached to the disc 31 is bent over the disc 32 to exert retaining pressure thereon. The skein 33' is looped over the hooks 35 attached to the skein arms 36 by means of the threaded bolt 37 bent at 38 to form the hook 35. By providing the nut 39 and the flange 40, the bolt 37 can be adjusted to various positions within the skein arm slot 41, thereby providing means for holding skeins of varying sizes. Slot 41 is formed by the two parallel bars 42 joined at 43 and at 44 from which extend the resilient spring bands 45 which are spring biased away from each other, as better seen in Figure 3. Rods 46 extend from bands 45 for insertion into the slots 47 formed through the rim 34. The slots 47 are of much smaller width than the normal spacing of the rods 46 whereby insertion of the rods 46 into the slots 47 will result in retention of the rods therein. The rods obviously can be removed by simply pressing the bands 45 together and exerting a withdrawing force on the arms 36.

In operation, the user loops the yarn skein 33' over the plurality of spaced arms 36, adjusts the position of the hooks 35 for the skein size involved and proceeds to wind the yarn into a ball. The winding operation unreels the yarn and causes the discs 31 and 32 to revolve by virtue of the connection of shaft 21 to the shaft 18. An oil hole 48 is provided through the bearing support 49 to lubricate the bearing surfaces.

To disassemble the device, the arms 36 are removed from the slots 47, the discs 31 and 32 are taken apart by loosening the screw 29, the sub-assembly 20 is removed from the shaft 18 by means of the nut 19, and the bracket 10 is removed from the table 14. It is apparent that within a short period and with a minimum of effort the entire assembly can be taken apart and conveniently stored. Reassembly is accomplished in the reverse, but still simple, process.

Fabrication costs are a minimum, the device is sturdy, and any of the parts can readily be replaced.

Conventional materials, such as sheet metal, plastic, wood, etc. can all be utilized as desired.

It should be further understood that the many species resulting from changes in size, shape or material are all within the inventive scope.

Having thus described the nature of the invention, what is claimed is as follows:

1. In a skein holder, a wheel assembly mounted on a stationary support for rotation in a vertical plane, comprising a plurality of spaced radially projecting arms, each of said arms having a closed longitudinal slot at the outer end and a pair of resilient expansible legs at the inner end thereof, an outwardly protruding arcuate portion intermediate said slot and each leg normally biasing each of said legs toward an open position relative to the other said leg, said wheel having portions defining a slot for receiving each of said arms, and said slot defining portions engaging said legs to maintain said legs in said wheel in a closed position against the action of said arcuate portions.

2. In a skein holder, as set forth in claim 1, wherein said wheel comprises a centrally disposed hub, and said legs are in abutment with said hub and secured against radial movement inwardly of said wheel.

References Cited in the file of this patent
UNITED STATES PATENTS

| 796,962 | Earl | Aug. 8, 1905 |
| 1,262,446 | Caron | Apr. 9, 1918 |
| 1,913,632 | Green | June 13, 1933 |

FOREIGN PATENTS

| 175,725 | Great Britain | Feb. 17, 1922 |
| 223,759 | Great Britain | Oct. 30, 1924 |